US008123403B2

(12) United States Patent
Ichida et al.

(10) Patent No.: US 8,123,403 B2
(45) Date of Patent: Feb. 28, 2012

(54) TEMPERATURE SENSOR PROBE AND MANUFACTURING METHOD OF THE SAME

(75) Inventors: Shunji Ichida, Tokyo (JP); Seiichiro Kinugasa, Tokyo (JP); Atsushi Kato, Tokyo (JP)

(73) Assignee: Yamatake Corporation, Tokyo (JP)

( * ) Notice: Subject to any disclaimer, the term of this patent is extended or adjusted under 35 U.S.C. 154(b) by 312 days.

(21) Appl. No.: 12/269,553

(22) Filed: Nov. 12, 2008

(65) Prior Publication Data

US 2009/0135880 A1 May 28, 2009

(30) Foreign Application Priority Data

Nov. 22, 2007 (JP) ................................ 2007-302586

(51) Int. Cl.
  *G01K 11/00* (2006.01)
  *G01J 5/00* (2006.01)
(52) U.S. Cl. ........................................ 374/161; 374/131
(58) Field of Classification Search .................. 374/161, 374/131
  See application file for complete search history.

(56) References Cited

U.S. PATENT DOCUMENTS

| | | | | |
|---|---|---|---|---|
| 4,288,159 A | * | 9/1981 | Newman | 374/161 |
| 4,542,987 A | * | 9/1985 | Hirschfeld | 356/44 |
| 4,592,662 A | * | 6/1986 | Robbins et al. | 374/57 |
| 4,749,856 A | * | 6/1988 | Walker et al. | 250/227.11 |
| 4,776,827 A | * | 10/1988 | Greaves | 374/161 |
| 4,988,212 A | * | 1/1991 | Sun et al. | 374/161 |
| 5,037,615 A | * | 8/1991 | Kane | 422/82.08 |
| 5,112,137 A | | 5/1992 | Wickersheim et al. | |
| 5,183,338 A | * | 2/1993 | Wickersheim et al. | 374/131 |
| 5,211,480 A | | 5/1993 | Thomas et al. | |
| 5,255,980 A | * | 10/1993 | Thomas et al. | 374/161 |
| 5,355,423 A | * | 10/1994 | Phillips | 385/12 |
| 5,885,484 A | * | 3/1999 | Allison et al. | 252/301.4 P |
| 6,086,250 A | * | 7/2000 | Rouhet et al. | 374/161 |
| 6,283,632 B1 | * | 9/2001 | Takaki | 374/161 |

(Continued)

FOREIGN PATENT DOCUMENTS

JP 2002-71473 A 3/2002

OTHER PUBLICATIONS

Grattan, K.T.V. and Zhang, Z.Y., "Fiber Optic Fluorescence Thermometry", Sensor Physics and Technology; selected pages: p. 21, p. 39, p. 88, p. 94, p. 119, p. 141, pp. 150-151; published by Chapman & Hall (London); 1st edition 1995.

*Primary Examiner* — Lisa Caputo
*Assistant Examiner* — Mirellys Jagan
(74) *Attorney, Agent, or Firm* — McDermott Will & Emery LLP

(57) ABSTRACT

To provide a temperature sensor probe that can conduct stable measurements, and the manufacturing method of the same. The temperature sensor probe related to the present invention provides: a fluorescent material that is a mixture of a fluorescent substance and a transparent material; a thermosensitive part having a concave part in which the fluorescent material is arranged; a waveguide route rod that propagates excitation light, which is irradiated on the fluorescent material, and fluorescent light, which is produced by the fluorescent substance; and a protective tube that covers the side surfaces of the waveguide route rod. Then, the fluorescent material is affixed to the tip of the waveguide route rod using the transparent material, and the waveguide route rod bites into the fluorescent material.

16 Claims, 6 Drawing Sheets

U.S. PATENT DOCUMENTS

| | | | |
|---|---|---|---|
| 7,113,675 B2* | 9/2006 | Nield et al. | 385/38 |
| 7,144,154 B2* | 12/2006 | Yates et al. | 374/161 |
| 2005/0135749 A1* | 6/2005 | Nield et al. | 385/38 |
| 2009/0135881 A1* | 5/2009 | Kinugasa et al. | 374/161 |
| 2009/0296770 A1* | 12/2009 | Kinugasa et al. | 374/1 |
| 2009/0296778 A1* | 12/2009 | Kinugasa et al. | 374/161 |

* cited by examiner

Drying and Sintering

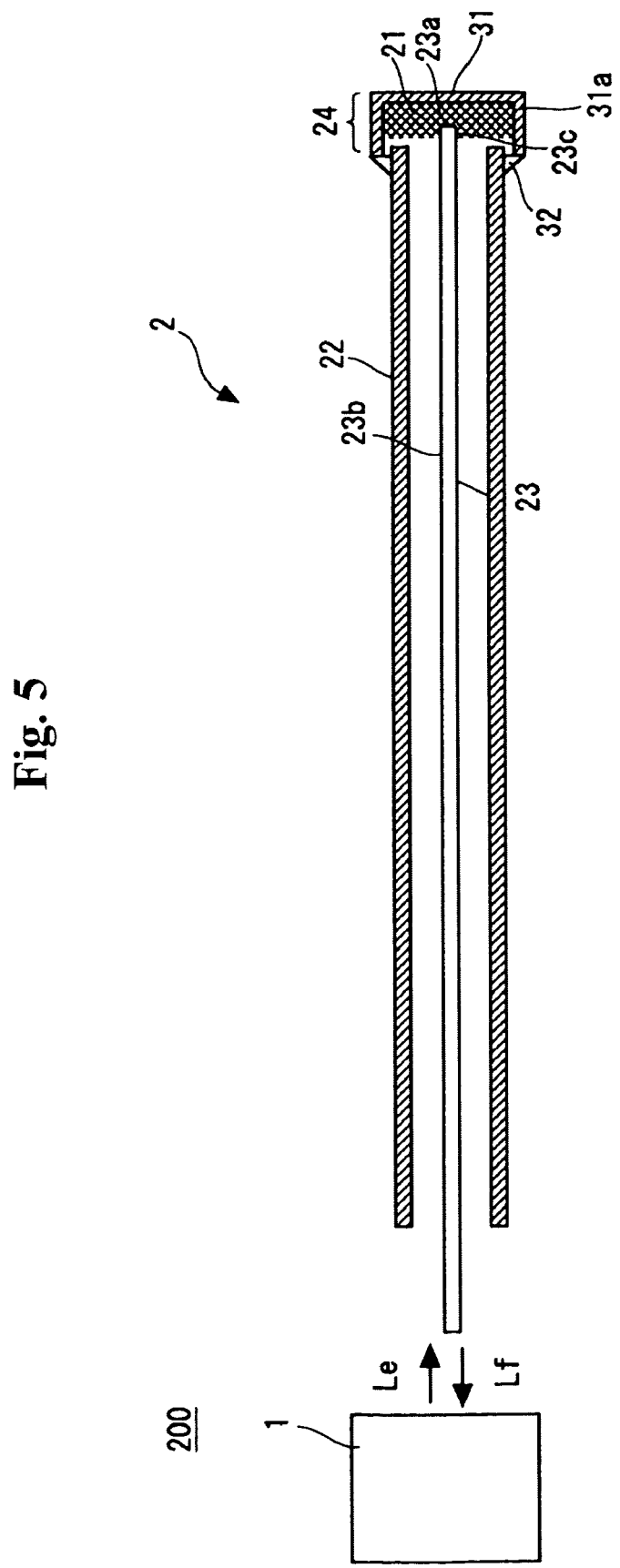

TEMPERATURE SENSOR PROBE AND MANUFACTURING METHOD OF THE SAME

CROSS-REFERENCE TO RELATED APPLICATION

This application claims the benefit under 35 U.S.C. §119 of Japanese Patent Application No. 2007-302586, filed on Nov. 22, 2007, which is hereby incorporated by reference herein in its entirety.

BACKGROUND OF THE INVENTION

1. Field of the Invention

The present invention relates to a temperature sensor probe and manufacturing method of the same, and more specifically relates to a temperature sensor probe and manufacturing method of the same for measuring temperature using a fluorescent substance that changes fluorescence characteristics based on temperature.

2. Description of the Related Art

Fluorescent type temperature sensors that use fluorescent substances are widely used as temperature sensors. Japanese Laid-Open Patent Application No. 2002-71473. In a fluorescent type temperature sensor, the temperature is measured using a fluorescent substance that changes fluorescence characteristics depending on temperature. Concretely, excitation light from a light source is irradiated on the fluorescent substance, and the fluorescence produced by the fluorescent substance is detected. Then, the temperature is measured based on the changes in fluorescence characteristics such as fluorescence lifetime.

In the temperature sensor probe used in this kind of temperature sensor, optical fibers are provided for irradiating excitation light on the fluorescent substance (U.S. Pat. No. 5,211,480). In the temperature sensor probe of U.S. Pat. No. 5,211,480, powdered fluorescent substance is packed in the end of the tube (refer to FIG. 5). Then, optical fiber bar cable is inserted into the tube. An adhesive material is provided in the inlet of the tube, and the optical fiber cable is affixed to the tube.

Nonetheless, in the probe of U.S. Pat. No. 5,211,480, the powdered fluorescent substance is not fixed, and therefore the powdered fluorescent substance is displaced by vibration etc. and the intensity of fluorescence is changed during measurement. Specifically, the powdered fluorescent material in the tube moves in small amounts when the probe is vibrated. For that reason, there is the problem that the intensity of fluorescence fluctuates, making stable measurements of temperature difficult to obtain.

SUMMARY OF THE INVENTION

The present invention attempts to resolve these kinds of problems, and an object is to provide a temperature sensor probe that can conduct stable measurements, and the manufacturing method thereof.

A temperature sensor probe relating to the first aspect of the present invention is a temperature sensor probe for measuring temperature using a fluorescent substance that changes fluorescence characteristics based on temperature, including: a fluorescent material that mixes a fluorescent substance with a transparent material, a thermosensitive part comprising a concave part in which the aforementioned fluorescent material is arranged, a waveguide route member that propagates excitation light, which is irradiated on the aforementioned fluorescent material, and fluorescent light, which is generated by the aforementioned fluorescent material, and a protective tube that covers the side surface of the aforementioned waveguide route member, wherein the aforementioned fluorescent material is affixed to the tip of the aforementioned waveguide route member by the aforementioned transparent material, and the aforementioned waveguide route member bites into the aforementioned fluorescent member. The fluorescent material is thereby not displaced and the mechanical strength is improved, and therefore stable measurements are possible.

The temperature sensor probe relating to a second aspect of the present invention is the aforementioned temperature sensor probe further has a cap that is secured to one end of the aforementioned protective tube and configures the aforementioned thermosensitive part. Producibility can thereby be improved because the fluorescent material can be easily arranged in the concave part.

The temperature sensor probe relating to a third aspect of the present invention is the aforementioned temperature sensor probe, wherein the aforementioned cap and the aforementioned protective tube are joined. Deterioration of the fluorescent material can thereby be prevented, and stable measurements can be taken.

The temperature sensor probe relating to a fourth aspect of the present invention is the aforementioned temperature sensor probe, wherein the aforementioned thermosensitive part is configured by closing one end of the aforementioned protective tube. The number of parts can thereby be reduced.

The temperature sensor probe relating to a fifth aspect of the present invention is the aforementioned temperature sensor probe, wherein the aforementioned transparent material comprises powder binder, and the tip of the aforementioned waveguide route member and the aforementioned fluorescent material are affixed by sintering the aforementioned fluorescent material. Affixing can thereby be reliably conducted, and stable measurements can be taken.

The temperature sensor probe relating to a sixth aspect of the present invention is the aforementioned temperature sensor probe, wherein the aforementioned transparent material comprises a cured resin. Affixing can thereby be reliably conducted, and stable measurements can be taken.

A method for manufacturing a temperature sensor probe relating to a seventh aspect of the present invention is a method for manufacturing a temperature sensor probe including an excitation light, which is irradiated on a fluorescent substance, and a waveguide route member, which propagates the fluorescent light generated by the fluorescent substance, comprising the steps of: arranging a fluorescent material, which is a mixture of the fluorescent substance and a transparent material, on a concave part where a thermosensitive part is provided, pressing the aforementioned waveguide route member into the fluorescent material arranged in the aforementioned concave part, and affixing the aforementioned fluorescent material onto the aforementioned waveguide route member using the aforementioned transparent material in a state in which the aforementioned waveguide route member is pressed into the aforementioned fluorescent material. The fluorescent material thereby does not become displaced, the mechanical strength is improved, and therefore stable measurements can be taken.

The method for manufacturing a temperature sensor probe relating to an eighth aspect of the present invention is the aforementioned method for manufacturing a temperature sensor probe, wherein, when arranging the aforementioned fluorescent material, the aforementioned fluorescent material is arranged in a cap comprising the aforementioned concave part, and a protective tube that covers the sides of the aforementioned waveguide route member is installed in the aforementioned cap. The producibility can thereby be improved because the fluorescent material can be easily arranged in the concave part.

The method for manufacturing a temperature sensor probe relating to a ninth aspect of the present invention is the aforementioned method for manufacturing a temperature sensor probe, further has a step of joining the aforementioned protective tube and the aforementioned cap. Deterioration of the fluorescent material can thereby be prevented, and stable measurement can be conducted.

The method for manufacturing a temperature sensor probe relating to a tenth aspect of the present invention is the aforementioned method for manufacturing a temperature sensor probe, wherein, in the step of arranging the aforementioned fluorescent material, the aforementioned fluorescent material is arranged inside the protective tube where one end is closed, and in the step of pressing in the aforementioned waveguide route member, the aforementioned waveguide route member bites into the fluorescent material arranged in the aforementioned one end of the aforementioned protective tube by inserting the aforementioned waveguide route member from the other end where the aforementioned protective tube is open. The number of parts can thereby be reduced.

The method for manufacturing a temperature sensor probe relating to an eleventh aspect of the present invention is the aforementioned method for manufacturing a temperature sensor probe, wherein the aforementioned transparent material comprises a powder binder, and in the step of affixing the aforementioned fluorescent material, the aforementioned fluorescent material is sintered. The material can thereby be reliably affixed, and stable measurements can be conducted.

The method for manufacturing a temperature sensor probe relating to a twelfth aspect of the present invention is the aforementioned method for manufacturing a temperature sensor probe, wherein the aforementioned transparent material comprises a resin, and in the step of affixing the aforementioned fluorescent material, the aforementioned resin is hardened. The material can thereby be reliably affixed, and stable measurements can be conducted.

The present invention provides a temperature sensor probe that can conduct stable measurements, and the manufacturing method thereof.

BRIEF DESCRIPTION OF THE DRAWINGS

FIG. 5 is a side view cross-sectional diagram indicating an example of another configuration of the temperature sensor related to an embodiment of the present invention.

DETAILED DESCRIPTION OF THE PREFERRED EMBODIMENTS

Concrete embodiments applying the present invention will be explained in detail below while referring to the diagrams.

Figure 1:
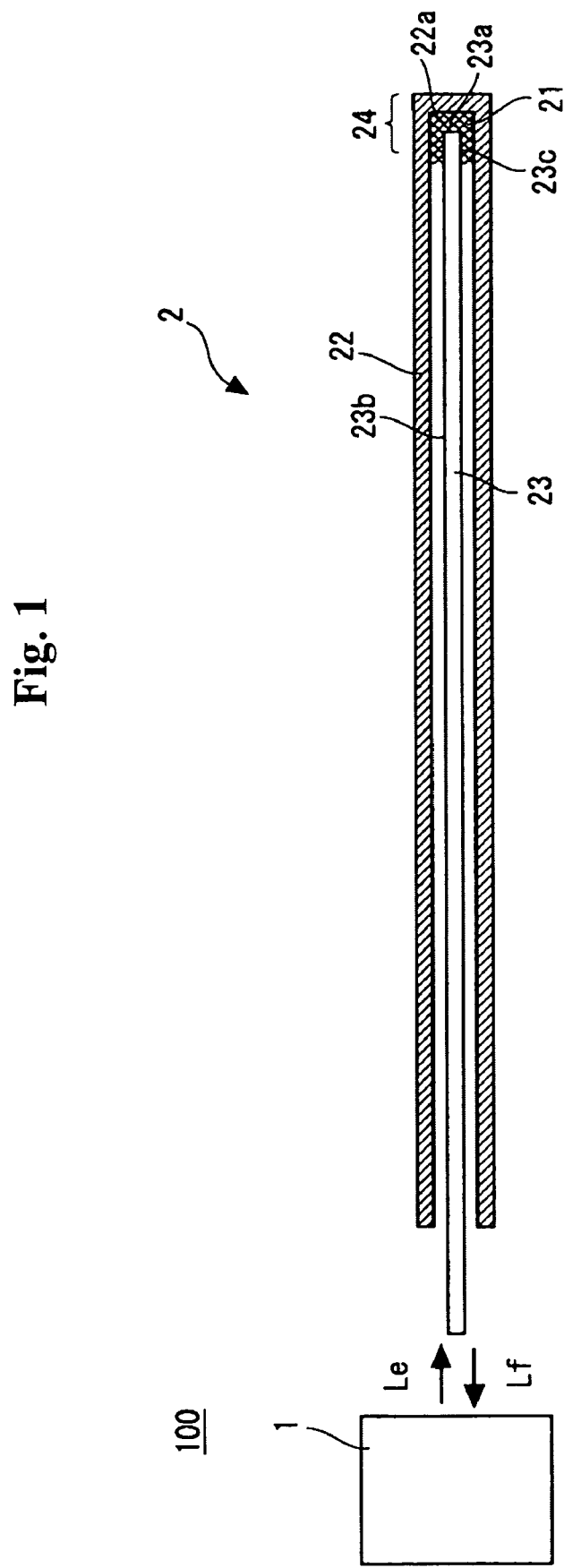
FIG. 1 is a side view cross-sectional diagram indicating the configuration of a temperature sensor related to an embodiment of the present invention.

FIG. 1 is a side view diagram schematically indicating the configuration of a temperature sensor.

Temperature sensor 100 has a main unit 1 and a sensor probe 2. The temperature sensor 100 is a fluorescent type temperature sensor that measures temperature using a fluorescent substance in which the fluorescence characteristics change depending on temperature. Accordingly, a fluorescent material 21 that contains the fluorescent substance is provided in the sensor probe 2. Then, the sensor probe 2 is installed on the main unit 1 through a connector (not indicated in the diagram), etc. Provided on the main unit 1 are: a light source, which emits the excitation light $L_e$ that is irradiated on the fluorescent material 21; a light detector, which detects the fluorescent light $L_f$ generated by the fluorescent substance contained in the fluorescent material 21; and a half mirror, etc. for separating the excitation light $L_e$ from the fluorescent light $L_f$. Further, the main unit 1 is not limited to the configuration described above.

Next, the sensor probe 2 related to the present embodiment will be explained in detail. The sensor probe 2 constitutes a fluorescent material 21, a protective tube 22, and a waveguide route rod 23. The tip of the sensor probe 2 has a thermosensitive part 24 that measures temperature.

The fluorescent material 21 is arranged on the tip of the protective tube 22 that constitutes the thermosensitive part 24. Moreover, the waveguide route rod 23 is inserted into the protective tube 22, and contacts the fluorescent material 21. The protective tube 22, for example, is a cylindrical metal tube with one end closed and the other end open. Here, the end of the protective tube 22 that is closed shall be the "closed end", and the other end that is open shall be the "open end". In FIG. 1, the left side is the open end, and the right side is the closed end. Consequently, a concave part 22a for housing fluorescent material 21 is formed on the closed end of the protective tube 22. Then, the fluorescent material 21 is housed in the concave part 22a of the protective tube 22, and the open end of the protective tube 22 is installed in the main unit 1. Stainless steel, aluminum, and heat resistance steel, etc. may, for example, be used as the material of the protective tube 22. The temperature of the fluorescent material 21 changes rapidly by using this kind of highly thermoconductive metallic material, and therefore accurate measurements can be taken. Of course, the protective tube 22 may be configured by a material other than a metal.

The fluorescent material 21 contains a powdered fluorescent substance and a binder. Powdered ruby or alexandrite can, for example, be used as the fluorescent substance. Powdered transparent quartz or glass can, for example, be used as the binder. Consequently, the excitation light $L_e$ and the fluorescent light $L_f$ are transmitted through the binder. The binder is configured by a transparent material through which the excitation light $L_e$ and the fluorescent light $L_f$ are transmitted. Here, "transparent" is not limited to substances that completely transmit light, and may refer to substances that transmit without substantially absorbing the excitation light $L_e$ and the fluorescent light $L_f$. The fluorescent material 21 is formed by uniformly mixing the powdered fluorescent substance and the powdered binder. The fluorescent substance changes fluorescence characteristics depending on temperature.

The waveguide route rod 23 has a long, narrow rod shape. The waveguide route rod 23, for example, is a waveguide route member such as a quartz rod or an optical fiber that propagates light. Further, bundled fibers in which multiple optical fibers are bundled together may be used. Consequently, the waveguide route rod 23 is configured by transparent material with a high refractive index such as quartz or glass. The excitation light $L_e$ from the main unit 1 and the fluorescent light $L_f$ generated by the fluorescent material 21 are propagated by repeatedly being fully reflected inside the waveguide route rod 23. Specifically, the waveguide route rod 23 is the light delivery route for irradiating the fluorescent material with the excitation light $L_e$.

The end of the closed end side of the protective tube 22 constitutes the thermosensitive part 24. Specifically, the tip part of the protective tube 22 that houses the fluorescent material 21 is the thermosensitive part 24. Then, the outside end surface of the closed end of the protective tube 22 is the contact surface that makes contact with the object to be measured. For example, the temperatures of the protective tube 22 and the fluorescent material 21 change by the thermosensitive part 24 coming into contact with the object to be measured. Specifically, heat from the object to be measured is conducted through the protective tube 22 to the fluorescent material 21, or heat from the fluorescent material 21 is conducted through the protective tube 22 to the object to be measured. The temperature of the fluorescent material 21 thereby changes, and becomes nearly equivalent to that of the object to be measured. Moreover, the heat can be rapidly transferred because the protective tube 22 is composed of a metallic material.

For example, in the state with thermosensitive part 24 in contact with the object to be measured, pulses of excitation light $L_e$ exit from the main unit 1. When this happens, the excitation light $L_e$ passes through the interior of the waveguide route rod 23 by being repeatedly and fully reflected by the side surfaces 23b of the wave guide route rod 23, and exits from the end surface 23a of the waveguide route rod 23. Then, the excitation $L_e$ that has exited from the end surface 23a is irradiated on the fluorescent material 21. The fluorescent substance in the fluorescent material 21 is thereby excited, and fluorescent light $L_f$ is produced from the fluorescent substance. This fluorescent light $L_f$ falls incident on the end surface 23a of the waveguide route rod 23. Specifically, the fluorescent light $L_f$ falls incident from the end surface 23a of the waveguide route rod 23 into the interior of the waveguide route rod 23. Then, fluorescent light $L_f$ is propagated inside the waveguide route rod 23 and is detected by a detector in the main unit 1. Here, the fluorescence characteristics such as the fluorescence lifetime changes depending on the temperature of the fluorescent material 21, specifically, depending on the temperature of thermosensitive part 24. The temperature can be measured by detecting the attenuation characteristics of the fluorescent light $L_f$. Further, the processing for deriving the temperature from the changes in fluorescence characteristics is not particularly limited.

The fluorescent material is affixed to the waveguide route rod 23. Further, the waveguide route rod 23 bites into the fluorescent material 21. Consequently, not only the end surface 23a of the waveguide route rod 23, but also the tip of the side surface 23b (called tip side surface 23c hereinafter) is covered with fluorescent material 21. In this way the fluorescent material 21 adheres not only to the end surface 23a of the waveguide route rod 23 but also to the tip side surface 23c. The sensor probe 2 can thereby be mechanically stabilized.

In the state with the waveguide route rod 23 biting into the fluorescent material 21 in this way, the waveguide route rod 23 and the fluorescent material 21 adhere together. For that reason, displacement of the powdered fluorescent substance contained in the fluorescent material 21 can be prevented, and stable temperature measurements become possible. Further, the contact surface area of the fluorescent material 21 and the waveguide route rod 23 increased when biting in. For that reason, reliable adhesion is possible. Consequently, removal of the fluorescent material 21 from the waveguide route rod 23 can be prevented, and the mechanical stability of the sensor probe 2 can be improved. For example, mechanical stability can be enhanced by the waveguide route rod 23 biting into the fluorescent material 21 by about 0.5 mm. Biting in 0.5 mm or more in this way is preferable. Of course, the amount of bite in not limited to the above value, and the amount of bite should be one that can cause stability.

Moreover, the fluorescent material 21 may also adhere to the protective tube 22 by using adhesive material such as a binder. Specifically, the protective tube 22 and the waveguide route rod 23 are joined through the fluorescent material 21. Propagation to the fluorescent material 21 can thereby be effectively conducted, and accurate measurements can be taken. Further, the mechanical stability can be improved. In addition, the adhesive material for affixing the fluorescent material 21 to the waveguide route rod 23 is not limited to a binder. Transparent resin material can also be used as the adhesive material.

Further, a gap is provided between the waveguide route rod 23 and the protective tube 22. Specifically, the internal diameter of the protective tube 22 is greater that the external diameter of the waveguide route rod 23. The side surface 23b of the waveguide route rod 23 does not thereby contact the protective tube 22 and a clearance is produced. Consequently, a gas layer exists between the waveguide route rod 23 and the protective tube 22. Damage to the waveguide route rod 23 can thereby be prevented. Specifically, the protective tube 22 and the waveguide route rod 23 are made of different materials and have different thermal expansion coefficients. For example, the protective tube 22 composed of metal normally has a thermal expansion coefficient 1 decimal place higher or more than that of the waveguide route rod 23 composed or quartz, etc. If the waveguide route rod 23 and the protective tube 22 are in contact and heated, the amount of expansion based on temperature changes will be different. For that reason, there is the risk that the waveguide route rod 23 may be damaged. In the present embodiment, there is a space occupied by a gas layer between the protective tube 22 and the waveguide route rod 23.

Next, the method for manufacturing the sensor probe 2 will be explained using FIG. 2. FIG. 2 is a processing step cross-sectional diagram indicating the method for manufacturing the sensor probe 2. First, as indicated in FIG. 2(*a*), the protective tube 22 is used. Here, the protective tube 22 is arranged such that the closed end is at the bottom, and the open side is at the top. As indicated in FIG. 2(*b*), the fluorescent substance 25 and the binder 26 are mixed. A mixture 27, in which the fluorescent substance 25 and the binder 26 are mixed, is thereby formed. Here, the mixture 27 is dissolved in a solvent, and the mixture 27 is made into a highly viscous paste.

Then, the mixture 27 is housed inside the protective tube 22. Specifically, the solvent containing the mixture 27 is poured into the protective tube 22. As indicated in FIG. 2(*c*), the mixture 27 is arranged in the concave part 22a of the protective tube 22. The mixture 27 inside the concave part 22a forms a layer of the fluorescent substance 25 and the binder 26. Then, as indicted in FIG. 2(*d*), when evaporating the solvent, the mixture 27 is arranged in the concave part 22a of the protective tube 22. Further, if the powder is directly arranged in the protective tube 22 without dissolving the mixture 27 in a solvent, then this processing step is not necessary.

Figure 2A:
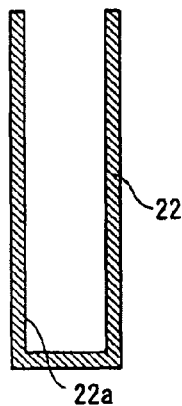
FIG. 2 is a processing step cross-sectional diagram indicating the manufacturing steps of a temperature sensor related to the embodiment of the present invention.
Figure 2B:
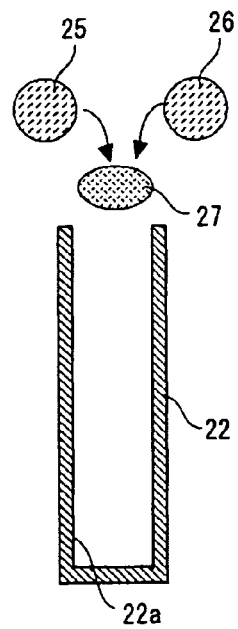
Figure 2C:
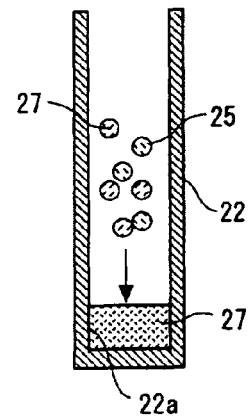
Figure 2D:
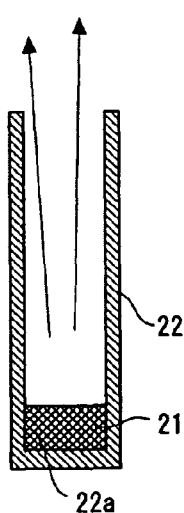
Figure 2E:
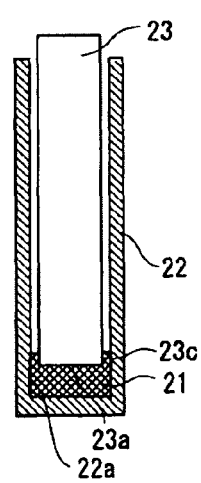
Figure 2F:
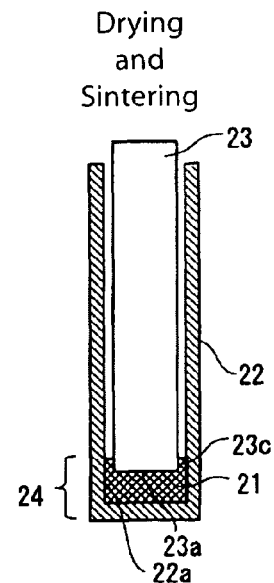

Next, the waveguide route rod 23 is inserted into the protective tube 22 in which the fluorescent material 21 is housed. Here, the waveguide route rod 23 is inserted from the open end, and the waveguide route rod 23 is pressed into the fluorescent material 21. The tip of the waveguide route rod 23 is thereby embedded in the fluorescent material 21. Then, as indicated in FIG. 2(e), the waveguide route rod 23 bites into the fluorescent material 21. Specifically, the tip side surface 23c and the end surface 23a of the waveguide route rod 23 have made contact with the fluorescent material 21. The fluorescent material 21 is dried and sintered in this state. As indicated in FIG. 2(f), the fluorescent material 21 is thereby affixed to the waveguide route rod 23. The binder 26 contained in the fluorescent material 21 tightly adheres to the waveguide route rod 23 and the protective tube 22. In other words, the protective tube 22 and the waveguide route rod 23 are joined based on the fluorescent material 21. The powdered fluorescent substance 25 and the binder 26 are mixed, sintered and housed in the concave part 22a of the protective tube 22. The waveguide route rod 23 is set up so as to bite into the fluorescent material 21.

The sensor probe 2 having the thermosensitive part 24 is manufactured in this way. Consequently, a sensor probe 2 that can stably conduct measurements can be easily manufactured. The protective tube 22, fluorescent material 21, and waveguide route rod 23 are fixed and do not move based on the adhesion of the fluorescent material 21, thus making stable measurements possible. Further, the intensity of fluorescence can be heightened by including the binder 26 in the fluorescent material 21 thereby separating the powder of the fluorescent substance 25. More stable measurements are thereby made possible.

Exposure of the fluorescent material 21 to the outside air can be prevented by arranging the fluorescent material 21 in the protective tube 22 that has a closed end. Consequently, deterioration of the fluorescent material 21 can be prevented, and stable measurements can be taken over a long period. Further, the protective tube 22 and waveguide route rod 23 may also be joined at the open end of the protective tube 22. The open end of the protective tube 22 can thereby be sealed, and deterioration of the fluorescent substance 25 can be reduced. Specifically, the gap between the protective tube 22 and the waveguide route rod 23 may be closed at the open end of the protective tube 22 using an adhesive, etc. The deterioration of the fluorescent material 21 can thereby be prevented, and stable measurements can be conducted.

Substances other than a binder may be used as the adhesive for affixing the fluorescent material 21 and the waveguide route rod 23. For example, a transparent resin such as a thermoset resin or a moisture curing resin may be used. In this case, the powdered fluorescent material 21 is added and mixed into the resin prior to curing. Then, with the waveguide route rod 23 biting into the fluorescent material 21, the resin is cured. The fluorescent material 21 thereby adheres to the waveguide route rod 23. Moreover, manufacturing can be simplified by a thermoset resin as the adhesive. Specifically, reliable and simple adhesion is possible because the thermoset resin is cured just by heating using a heat treatment.

Of course, resins other than thermoset resins, such as moisture curing resins and photoset resins, may be used. Specifically, any curing resin that can be harden can be used as the adhesive. With the waveguide route rod 23 pressed into the fluorescent material 21 prior to hardening, the resin in the fluorescent material 21 is then hardened. The fluorescent material 21 can thereby be affixed to the waveguide route rod 23. The waveguide route rod 23 and the protective tube 22 can thereby be joined, and the mechanical stability is improved. Further, as long as the substance is transparent, these other materials may be used for affixing. Further, two or more kinds of adhesive materials may be used.

Figure 3:
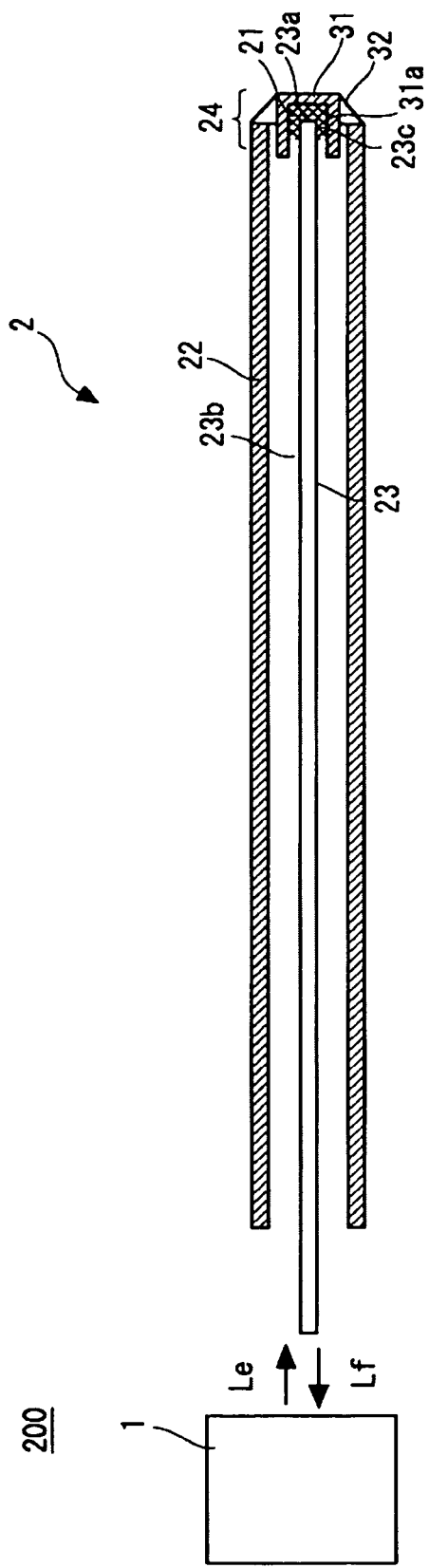
FIG. 3 is a side view cross-sectional diagram indicating the configuration of a temperature sensor related to another embodiment of the present invention.

A temperature sensor related to another embodiment will be explained using FIG. 3. FIG. 3 is a side view cross-sectional diagram indicating the configuration of a temperature sensor 200. In the present embodiment, the configuration of the thermosensitive part 24 of the sensor probe 2 differs from that of the temperature sensor 100 of the embodiment 1. Concretely, both ends of the protective tube 22 are open, and a cap 31 that closes off one of the open ends is provided. Accordingly, this cap 31 configures the thermosensitive part 24. The outside end surface of the cap 31 is the contact surface that contacts the object to be measured. Further, explanation of the basic configuration of the temperature sensor 200 will be omitted for content that is the same as that of the temperature sensor 100 of the above embodiment.

In the present embodiment, the cap 31 is arranged on one end of the protective tube 22. This cap 31 has a concave part 31a for housing the fluorescent material 21, and constitutes the thermosensitive part 24. Specifically, the fluorescent material 21 is arranged in the concave part 31a of the cap 31. The cap 31 can be formed by the same metallic material as that of the protective tube 22. Of course, the cap 31 and the protective tube 22 may be made of differing materials. The outer diameter of the cap 31 is slightly smaller than the interior diameter of the protective tube 22, and one part of the cap 31 fits into the interior of the protective tube 22. Specifically, the cap 31 is inserted into the protective tube 22. The fluorescent material 21 is affixed to the cap 31 that has been inserted into the protective tube 22. Specifically, the protective tube 22 and waveguide route rod 23 are joined by the fluorescent material 21.

Then, the waveguide route rod 23 is affixed so as to bite into the fluorescent material 21 in the same way as in the other embodiment. Stable measurement of temperature can thereby be conducted in the same way as in the above embodiment. In the present embodiment, the cap 31 that configures the thermosensitive part 24 is composed of a material different than that of the protective tube 22. Further, the cap 31 is joined to the protective tube 22 by an adhesive 32. The space between the cap 31 and protective tube 22 is thereby sealed. Consequently, exposure of the fluorescent material 21 to outside air can thereby be prevented. The deterioration of the fluorescent material 21 can be avoided, and stable measurements can be conducted. Further, the joining of the protective tube 22 and the cap 31 is not limited to the adhesive 32, and brazing, soldering, welding or the like may also be used.

Next, the method for manufacturing the sensor probe 2 related to the present embodiment will be explained using FIG. 4. FIG. 2 is a processing step cross-sectional diagram indicating the manufacturing steps of the sensor probe 2 related to the present embodiment. Explanation of the same steps as those in the other embodiment will be suitably omitted.

Figure 4A:
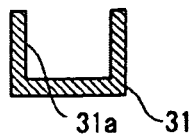
FIG. 4 is a processing step cross-sectional diagram indicating the manufacturing steps of a temperature sensor related to an embodiment of the present invention.
Figure 4C:
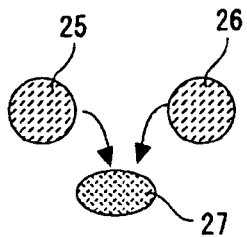
Figure 4C:
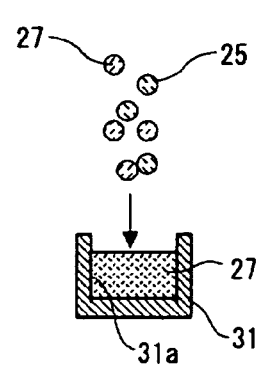
Figure 4B:
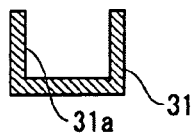

First, as indicated in FIG. 4(a), cap 31 having concave part 31a is used. Here, the cap 31 is arranged so that the concave part 31a is oriented upward. Then, as indicated in FIG. 4(b), a mixture 27, in which the fluorescent substance 25 and the binder 26 are mixed, is used. Here, a mixture 27 dissolved in a solvent is used. Then, as indicated in FIG. 4(c), the mixture 27 is poured into the cap 31. Specifically, the mixture 27 is arranged in the concave part 31a of the cap 31. The mixture 27 inside the concave part 31a thereby forms a layer of the fluorescent substance 25 and the binder 26.

Figure 4D:
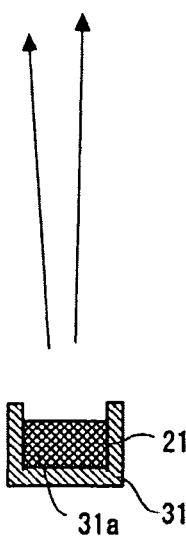
Figure 4E:
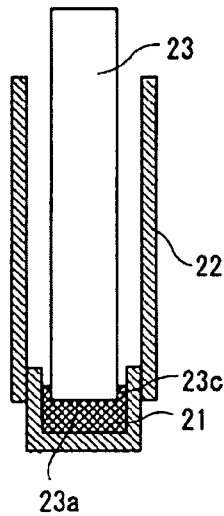
Figure 4F:
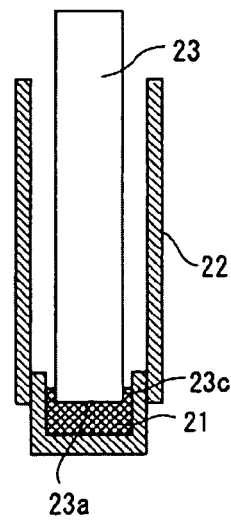
Figure 4G:
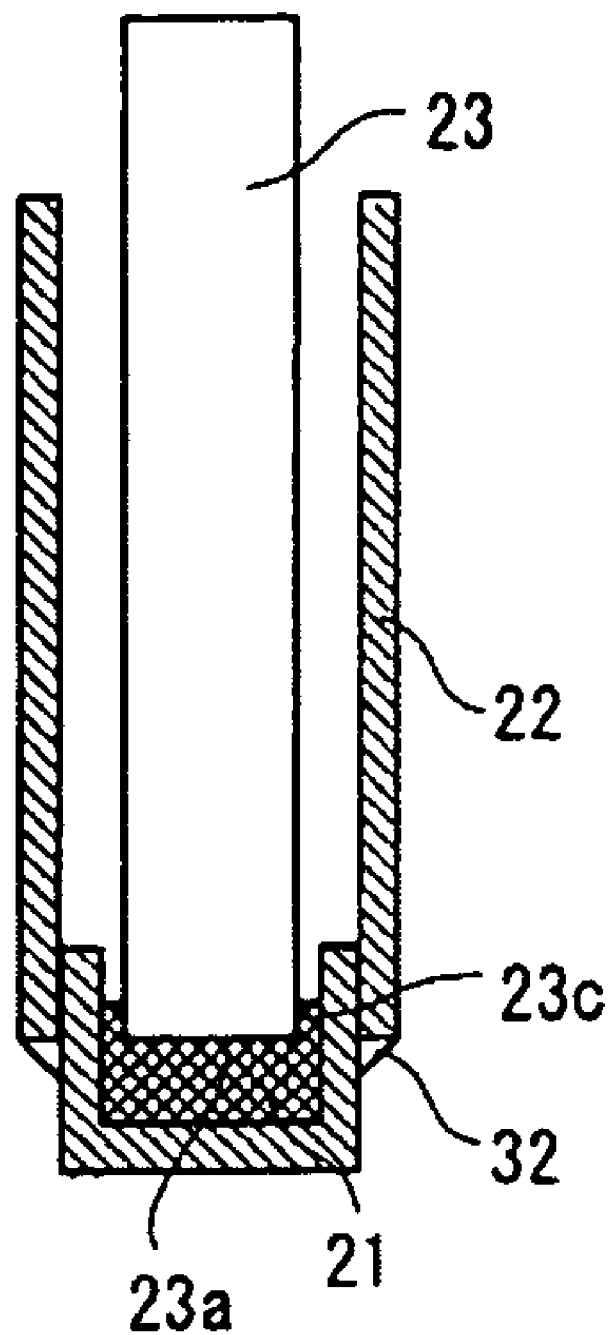

As indicted in FIG. 4(d), when evaporating the solvent, the fluorescent material 21 is arranged in the concave part 31a of the cap 31. Further, if the powder is directly placed in without using a solvent, then this processing step is not necessary. Next, the waveguide route rod 23 inserted in the protective tube 22 is pressed into the fluorescent material 21. Then, as indicated in FIG. 4(e), the waveguide route rod 23 bites into the fluorescent material 21. Specifically, the tip side surface 23c and the end surface 23a have made contact with the fluorescent material 21. When the fluorescent material 21 is dried and sintered in this state as indicated in FIG. 4(f), the fluorescent material 21 is thereby affixed to the waveguide route rod 23. Consequently, with the waveguide route rod 23 biting into the fluorescent material 21, the fluorescent material 21 is affixed to the waveguide route rod 23. Next, as indicated in FIG. 4(g), the cap 31 and the protective tube 22 are joined using the adhesive 32. Specifically, the adhesive 32 is provided in the gap between the cap 31 and the protective tube 22, and the gap is sealed. Further, the joining of the protective tube 22 and the cap 31 is not limited to the adhesive 32, and brazing, soldering, welding or the like may also be used. The mechanical stability can be improved by joining the cap 31 and the protective tube 22 in this way.

Stable measurements can thereby be conducted in the same way as with the above embodiment. Further, in the present embodiment the cap 31, which is a separate part, is used with the protective tube 22 as the thermosensitive part 24. The number of parts is thereby increased, but the fluorescent material 21 be easily arranged inside the concave part. Specifically, as the protective tube 22 becomes longer and as the diameter of the protective tube 22 becomes smaller, the fluorescent material 21 tends to adhere to the inner walls of the protective tube 22 when arranging the fluorescent material 21 inside the concave part. For example, depending on the measurement application, the protective tube 22 may be long and narrow with an internal diameter of about 1 to 1.5 mm and a length of approximately 100 mm. In this case, the mixture 27 or the fluorescent material 21 infused from the open end adheres to the inner walls. Consequently, it is difficult to arrange the fluorescent material 21 in the tip of the protective tube 21. Nonetheless, adherence of the fluorescent material 21 to the inner walls of the protective tube 22 can be prevented by using a cap 31 that is sufficiently shorter than the protective tube 22. For that reason, the fluorescent material 21 can be easily arranged inside the concave part, and producibility can be improved. Further, because only the cap 31 may be changed corresponding the measurement application, sensor probes 2 applicable to the target measurement can be easily manufactured. For example, the materials can be modified corresponding to the temperature and to the material of the object to be measured.

In addition, in the invention described above, the processing step of installing the protective tube 22 is the same as the processing step of installing the waveguide route rod 23, but the processing steps of installing the protective tube 22 and of installing the waveguide route rod 23 may separated. For example, the protective tube 22 may be installed before pressing the waveguide route rod 23 into the fluorescent material 21, and the protective tube 22 may be installed after sintering the fluorescent material 21. Specifically, if after the mixture 27 is housed in the concave part 31a, the processing step of installing the protective tube 22 may be implemented at either timing. In this way, the processing step of installing the protective tube 22 is not limited to the processing step in FIG. 4(e).

Further, in the above configuration the cap 31 was inserted into the protective tube 22, but the protective tube 22 may also be inserted into the cap 31. Specifically, as indicated in FIG. 5, the outer diameter of the protective tube 22 may be made smaller than the internal diameter of the cap 31. Then, the tip of the protective tube 22 is inserted into the cap 31. In this case as well, deterioration of the fluorescent materials can be prevented by joining the cap 31 and the protective tube 22 with the adhesive 32. Of course, in the present embodiment, resin may be used instead of the binder 26 in the same way as in embodiment 1. Further, the present invention is not limited to the embodiments above, and of course various design modifications may be implemented by a person skilled in the art.

The invention claimed is:

1. A temperature sensor probe for measuring temperature using a fluorescent substance that changes fluorescence characteristics based on temperature, comprising:
   a fluorescent material that mixes a fluorescent substance with a transparent material,
   a thermosensitive part comprising a concave part in which said fluorescent material is arranged,
   a waveguide route member that propagates excitation light, which is irradiated on said fluorescent material, and fluorescent light, which is generated by said fluorescent material, and
   a protective tube that covers the side surface of said waveguide route member having an open end and a closed end,
   wherein said fluorescent material is affixed to the tip of said waveguide route member by said transparent material, and said waveguide route member bites into said fluorescent member, and
   wherein a gap is formed between the waveguide route member and the protective tube and the gap extends from the open end to the closed end of the protective tube.

2. The temperature sensor probe according to claim 1, wherein said thermosensitive part is configured by closing one end of said protective tube.

3. The temperature sensor probe according to claim 1, wherein said transparent material comprises powder binder, and the tip of said waveguide route member and said fluorescent material are affixed by sintering said fluorescent material.

4. The temperature sensor probe according to claim 1, wherein said transparent material comprises a cured resin.

5. The temperature sensor probe according to claim 1, wherein the gap is filled with a gas.

6. The temperature sensor probe according to claim 1, wherein the gap prevents contact between the waveguide route member and the protective tube.

7. The temperature sensor probe according to claim 1 wherein the concave part further comprises a cap that is secured to one end of said protective tube and configures said thermosensitive part.

8. The temperature sensor probe according to claim 7, wherein said cap and said protective tube are joined.

9. A method for manufacturing a temperature sensor probe comprising an excitation light, which is irradiated on a fluorescent substance, and a waveguide route member, which propagates the fluorescent light generated by the fluorescent substance, comprising the steps of:
   arranging a fluorescent material, which is a mixture of the fluorescent substance and a transparent material, on a concave part where a thermosensitive part is provided,
   pressing said waveguide route member into the fluorescent material arranged in said concave part,
   affixing said fluorescent material onto said waveguide route member using said transparent material in a state in which said waveguide route member is pressed into said fluorescent material, inserting said waveguide route member in a protective tube that covers the sides of said waveguide route member, the protective tube having a closed end and an open end, and separating said waveguide route member and said protective tube with a gap extending between the closed end and the open end of the protective tube.

10. The method for manufacturing a temperature sensor probe according to claim 9, wherein, in the step of arranging said fluorescent material, said fluorescent material is arranged inside the protective tube where one end is closed, and in the step of pressing in said waveguide route member, said waveguide route member bites into the fluorescent material arranged in said one end of said protective tube by inserting said waveguide route member from the other end where said protective tube is open.

11. The method for manufacturing a temperature sensor probe according to claim 9, wherein said transparent material comprises a powder binder, and in the step of affixing said fluorescent material, said fluorescent material is sintered.

12. The method for manufacturing a temperature sensor probe according to claim 9, wherein said transparent material comprises a resin, and in the step of affixing said fluorescent material, said resin is hardened.

13. The method for manufacturing a temperature sensor probe according to claim 9, wherein the separating step further comprises the step of providing a gas layer in the gap.

14. The method for manufacturing a temperature sensor probe according to claim 9, wherein the separating step further comprises the step of preventing contact between the waveguide route member and the protective tube.

15. The method for manufacturing a temperature sensor probe according to claim 9, wherein the arranging step further comprises the steps of:

arranging said fluorescent material in a cap comprising said concave part and installing said cap on said protective tube.

16. The method for manufacturing a temperature sensor probe according to claim 15, further comprising a step of joining said protective tube and said cap.

\* \* \* \* \*